US008318117B2

(12) United States Patent
Lichtfers et al.

(10) Patent No.: US 8,318,117 B2
(45) Date of Patent: Nov. 27, 2012

(54) ABSORPTION MEDIUM AND METHOD FOR REMOVING SOUR GASES FROM FLUID STREAMS, IN PARTICULAR FROM FLUE GASES

(75) Inventors: Ute Lichtfers, Karlsruhe (DE); Robin Thiele, Speyer (DE); Susanna Voges, Ludwigshafen (DE); Georg Sieder, Bad Dürkheim (DE); Oliver Spuhl, Mannheim (DE); Hugo Rafael Garcia Andarcia, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/000,476

(22) PCT Filed: Jun. 9, 2009

(86) PCT No.: PCT/EP2009/057098
§ 371 (c)(1),
(2), (4) Date: Jan. 21, 2011

(87) PCT Pub. No.: WO2009/156271
PCT Pub. Date: Dec. 30, 2009

(65) Prior Publication Data
US 2011/0135549 A1 Jun. 9, 2011

(30) Foreign Application Priority Data

Jun. 23, 2008 (EP) .................................. 08158767
Apr. 24, 2009 (EP) .................................. 09158707

(51) Int. Cl.
*B01D 53/40* (2006.01)
*B01D 53/14* (2006.01)
*B01D 53/62* (2006.01)
*B01D 53/78* (2006.01)
*C07C 215/06* (2006.01)
*C07C 211/13* (2006.01)
*C07C 211/14* (2006.01)

(52) U.S. Cl. ...... 423/228; 423/220; 423/229; 423/242.1; 423/242.4; 423/242.7; 564/503; 564/511; 564/512

(58) Field of Classification Search .................. 423/210, 423/220, 226, 228, 229, 234, 242.1, 242.2, 423/242.4, 242.7; 564/503, 506, 507, 511, 564/512
See application file for complete search history.

(56) References Cited

U.S. PATENT DOCUMENTS

| 4,336,233 | A | 6/1982 | Appl et al. |
| 5,100,635 | A * | 3/1992 | Krishnamurthy et al. .... 423/235 |
| 6,165,433 | A | 12/2000 | Chakravarti et al. |
| 2004/0036055 | A1 | 2/2004 | Asprion et al. |
| 2006/0104877 | A1* | 5/2006 | Cadours et al. ............... 423/226 |
| 2008/0098892 | A1 | 5/2008 | Asprion et al. |
| 2009/0199711 | A1 | 8/2009 | Asprion et al. |

FOREIGN PATENT DOCUMENTS

| CA | 2651888 | * | 11/2008 |
| DE | 1544155 | * | 2/1970 |
| EP | 879 631 A1 | | 11/1998 |
| WO | WO-99/04885 A1 | | 2/1999 |
| WO | WO-02/07862 A1 | | 1/2002 |
| WO | WO-02/09849 A2 | | 2/2002 |
| WO | WO-2005/087350 A1 | | 9/2005 |
| WO | WO 2007/134994 | * | 11/2007 |
| WO | WO-2007/144372 A1 | | 12/2007 |
| WO | WO-2010100100 A1 | | 9/2010 |

OTHER PUBLICATIONS

Reddy et al., "Fluor's Econamine FG Plus Tevchnology," Second National Conference on Carbon Sequestration, National Energy Technology Laboratory / Departments of Energy, May 5-8, 2003.
International Preliminary Report on Patentability of International Application No. PCT/EP2009/057098 mailed Dec. 23, 2010.
English-language translation of International Preliminary Report on Patentability of International Application No. PCT/EP2009/057098 mailed Mar. 22, 2011.

* cited by examiner

(57) ABSTRACT

Absorption medium for acid gases comprising an oligoamine (A) of the general formula (I)

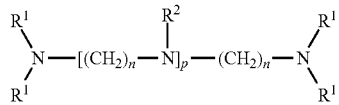

(I)

and a primary or secondary alkanolamine (B) of the general formula (II)

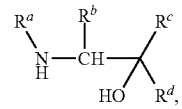

(II)

in which the weight ratio of oligoamine (A) to the primary or secondary alkanolamine (B) is 0.2 to 4, and also the process for removing acid gases from a gas stream by contacting the gas stream at a pressure of 0.05 to 10 MPa abs with an aqueous solution brought to and maintained at a temperature of 20 to 80° C. of said absorption medium.

20 Claims, 2 Drawing Sheets

ABSORPTION MEDIUM AND METHOD FOR REMOVING SOUR GASES FROM FLUID STREAMS, IN PARTICULAR FROM FLUE GASES

CROSS REFERENCE TO RELATED APPLICATIONS

This application is a national stage application under 35 U.S.C. §371 of PCT/EP2009/057098, filed Jun. 9, 2009, which claims benefit to European applications 08158767.7, filed Jun. 23, 2008, and 09158707.1. filed Apr. 24, 2009, respectively, the entire disclosures of which are hereby incorporated by reference.

The present invention relates to an absorption medium for acid gases comprising an oligoamine (A) and a primary or secondary alkanolamine (B) in which the weight ratio of oligoamine (A) to the primary or secondary alkanolamine (B) is 0.2 to 4. In addition, the present invention relates to a process for removing acid gases from a gas stream by contacting the gas stream at a pressure of 0.05 to 10 MPa abs with an aqueous solution brought to and maintained at 20 to 80° C. of said absorption medium.

Removing acid gases such as, for example, $CO_2$, $H_2S$, $SO_2$, COS, $CS_2$, HCN or mercaptans, from fluid streams, such as natural gas, refinery gas, synthesis gas, is of importance for differing reasons. Carbon dioxide must be moved, for example, from natural gas, since a high carbon dioxide concentration decreases the calorific value of the gas. In addition, carbon dioxide, in combination with moisture which is frequently entrained in the fluid streams, can lead to corrosion on pipes and fittings. In addition, the content of sulfur compounds in the natural gas must be reduced by suitable treatment measures, since the sulfur compounds can also form acids in the water frequently entrained in the natural gas, which acids are corrosive. For transport of the natural gas in a pipeline, therefore, preset limiting values of the sulfur-comprising impurities must be maintained. In addition, numerous sulfur compounds are, even in low concentrations, malodorous and, especially sulfur dioxide, toxic.

The removal of carbon dioxide from combustion waste gases or flue gases is desirable, in particular for reducing the emission of carbon dioxide which is considered the main cause of what is termed the greenhouse effect. Flue gases generally have a carbon dioxide partial pressure of 10 to 500 hPa. Customarily these flue gases are produced at a pressure close to atmospheric pressure. In order to achieve an effective removal of carbon dioxide, the absorption medium must have a high carbon dioxide affinity. The high carbon dioxide affinity means that, on the other hand, in the regeneration of the absorption medium, the carbon dioxide is generally insufficiently expelled and the regenerated absorption medium has a residual carbon dioxide loading. Only the difference between the maximum absorption capacity of the absorption medium and the residual loading of the regenerated absorption medium is available as circuit capacity.

An absorption medium which has proved particularly useful in practice for removing acid gases from, for example, synthesis gas, natural gas or biogas, is described in U.S. Pat. No. 4,336,233. This is an aqueous solution of methyldiethanolamine (MDEA) and piperazine as activator for increasing the absorption rate. The absorption medium described comprises 1.5 to 4.5 mol/L of methyldiethanolamine and 0.05 to 0.8 mol/L of piperazine.

EP-A 0 879 631 describes a process for removing carbon dioxide from a combustion gas by contacting the combustion gas at atmospheric pressure with an aqueous amine solution. The amine solution comprises a secondary and a tertiary amine, each in a concentration of 10 to 45% by weight.

U.S. Pat. No. 6,165,433 relates to removing carbon dioxide from a gas stream, the carbon dioxide partial pressure of which is 10 psia (689 hPa) or less, using an absorption medium which comprises water, 5 to 35% by weight of a fast amine and 5 to 50% by weight of a slow amine. Fast amines are monoethanolamine, diethanolamine, piperazine and diisopropanolamine. Slow amines are methyldiethanolamine, triethanolamine, and sterically hindered amines such as 2-amino-2-methyl-1-propanol.

WO 2005/087,350 discloses a process for removing carbon dioxide from flue gases using a liquid absorption medium which comprises a tertiary aliphatic amine and an activator such as 3-methylaminopropylamine. The tertiary aliphatic amine is said to have a reaction enthalpy $\Delta_R H$ of the protonation reaction which is greater than that of methyldiethanolamine. The absorption medium comprises 20 to 60% by weight of tertiary aliphatic amine and 1 to 10% by weight of activator.

Frequently, alkanolamines are used for removing carbon dioxide from flue gases.

WO 02/007,862 describes a process and an absorption medium for removing acid gases from a fluid stream. The absorption medium comprises a tertiary aliphatic alkanolamine and an activator such as 3-methylaminopropylamine. The treatment of fluid streams having low carbon dioxide partial pressures is not claimed.

WO 2007/144,372 describes a process for removing carbon dioxide from flue gases by contacting them with an aqueous solution of a tertiary aliphatic alkanolamine and an N-alkyldiamine which is specified in more detail. Preferred tertiary aliphatic alkanolamines which are mentioned are methyldiethanolamine, methyldiisopropanolamine and butyldiethanolamine. As a preferred activator, 3-methylaminopropylamine is mentioned in particular.

In particular, in industrial processes for removing carbon dioxide from flue gases, monoethanolamine (MEA) is preferably used as absorption medium. For instance, Satish Reddy et al. of Fluor Corporation, in an abstract for the Second National Conference on Carbon Sequestration of the National Energy Technology Laboratory/Department of Energy, Alexandria, Va., USA, held on May 5-8, 2003, under the title "Fluor's Econamine FG Plus$^{SM}$ Technology—An enhanced amine-based $CO_2$ capture process", describe the removal of carbon dioxide from flue gases using an absorption medium comprising monoethanolamine and a secret inhibitor. The latter suppresses the degeneration of monoethanolamine due to the presence of oxygen and at the same time protects the plant from corrosion. This process was already being used in 23 commercially operated plants at the time of publication.

Technologies based on monoethanolamine are distinguished by a high reactivity between amine and carbon dioxide. However, the high reactivity is disadvantageously accompanied by a high absorption enthalpy and a high energy demand for regeneration. Other alkanolamines such as, for instance, diethanolamine or methyldiethanolamine, which have a lower energy demand for regeneration, are suitable only with restrictions for this separation task owing to their slower reaction kinetics between carbon dioxide and amine.

WO 99/004,885 teaches the removal of acid gases from a gas stream by contacting the stream with an aqueous solution of an oligoamine specified in more detail having a concentration of 20 to 60% by weight, which preferably comprises an alkali metal compound or an aliphatic or cycloaliphatic monoamine or diamine as activator. Activators which are mentioned by name are sodium hydroxide, sodium hydrogen carbonate, triethylenediamine, dicyclohexylamine, N-ethylcyclohexylamine and N,N-dimethylcyclohexylamine. A disadvantage of the use of sodium hydroxide and sodium hydrogen carbonate as activator is the significantly increased energy demand in the regeneration stage. A disadvantage of the use of triethylenediamine is its slow reaction kinetics which are accompanied by a longer residence time or a greater exchange area in the absorption stage. A disadvantage of the use of dicyclohexylamine, N-ethylcyclohexylamine and N,N-dimethylcyclohexylamine is their limited miscibility with water which restricts the flexibility in matching the activator content.

It was an object of the present invention to find an absorption medium for acid gases and a process for removing acid gases from fluid streams which does not have said disadvantages of the prior art or has them only to a reduced extent, and which enables a higher circuit capacity and a lower regeneration demand, in particular with respect to the known processes using monoethanolamine, and simultaneously has sufficiently fast reaction kinetics between carbon dioxide and the amine.

DETAILED DESCRIPTION OF THE INVENTION

Figure 1:
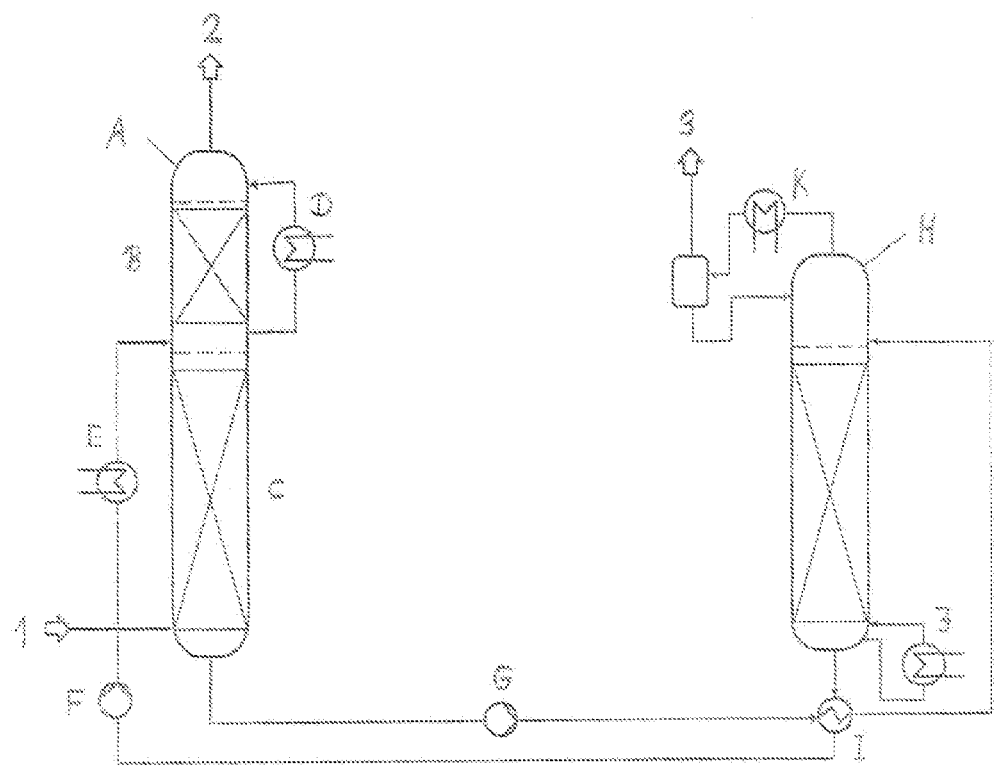
FIG. 1 shows a schematic outline of a plant suitable for carrying out the process according to the invention.

Accordingly, an absorption medium for acid gases has been found, comprising
(A) an oligoamine of the general formula (I)

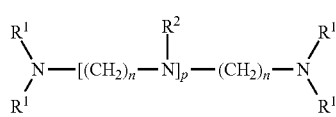

(I)

where
$R^1$ is hydrogen or $C_1$ to $C_3$ alkyl,
$R^2$ is hydrogen or $C_1$ to $C_3$ alkyl,
n is 2 to 6, and
p is 1 to 3; and
(B) a primary or secondary alkanolamine of the general formula (II)

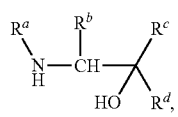

(II)

where
$R^a$ is hydrogen, $C_1$ to $C_3$ alkyl, —$CH_2CH_2OH$ or —$(CH_2)_mNH_2$ where m is 1 to 3,
$R^b$ is hydrogen or $C_1$ to $C_3$ alkyl,
$R^c$ is hydrogen or $C_1$ to $O_3$ alkyl, and
$R^d$ is hydrogen, $C_1$ to $C_3$ alkyl, —$CH_2OH$ or —$CH_2NH_2$,
wherein the weight ratio of oligoamine (A) to the primary or secondary alkanolamine (B)

$m$[oligoamine (A)]/$m$[alkanolamine (B)]

is 0.2 to 4.

Examples of suitable oligoamines (A) which may be mentioned are diethylenetriamine, bis(3-methylaminopropyl)methylamine, dimethyldipropylenetriamine, dipropylene-triamine, N,N',N''-trimethyl-bis(hexamethylene)triamines and bis(3-dimethylamino-propyl)amine. Preference is given to an oligoamine (A) of the general formula (I) in which $R^1$ is hydrogen or methyl, $R^2$ is hydrogen or methyl, n is 2 or 3, and p is 1. Particular preference is given to diethylenetriamine, bis(3-methylaminopropyl)-methylamine, dimethyldipropylenetriamine, dipropylenetriamine and bis(3-dimethyl-aminopropyl)amine, in particular bis(3-dimethylaminopropyl)amine ($R^1$ is methyl, $R^2$ is hydrogen, n is 3 and p is 1).

Preference is given to a primary or secondary alkanolamine (B) of the general formula (II) in which
$R^a$ is hydrogen, methyl, ethyl, —$CH_2CH_2OH$, —$CH_2NH_2$ or —$CH_2CH_2NH_2$,
$R^b$ is hydrogen or methyl,
$R^c$ is hydrogen or methyl, and
$R^d$ is hydrogen, methyl or —$CH_2OH$.

Particularly preferred primary or secondary alkanolamines (B) which may be mentioned are 1-amino-2-methyl-2-propanol, 3-methylamino-1,2-propanediol, 1-amino-2,3-propanediol, isopropanolamine, 2-amino-1-propanol, ethyletanolamine, 1,3-diamino-2-propanol, aminoethylethanolamine, diethanolamine and monoethanolamine. Very particular preference is given to monoethanolamine ($R^a$ to $R^d$ are hydrogen).

The weight ratio of oligoamine (A) to the primary or secondary alkanolamine (B)

$m$[oligoamine (A)]/$m$[alkanolamine (B)]

in the absorption medium according to the invention is 0.2 to 4, and preferably 0.3 to 2.

Based on the total amount of the absorption medium, the concentration of oligoamine (A) plus primary or secondary alkanolamine (B) is particularly advantageously 10 to 60% by weight, and in particular 20 to 50% by weight.

The concentration of oligoamine (A) based on the total amount of the absorption medium is preferably 1 to 20% by weight, particularly preferably 1 to 18% by weight, and very particularly preferably 10 to 18% by weight.

Particularly advantageously, the absorption medium further comprises water, wherein the weight ratio of the sum of oligoamine (A) plus primary or secondary alkanolamine (B) to water {$m$[oligoamine (A)]+$m$[alkanolamine (B)]}/$m$[water]

is 0.11 to 1.5, and particularly preferably 0.25 to 1.

The absorption medium can additionally further comprise physical solvents. A physical solvent is taken to mean a solvent which undergoes only a relatively weak interaction with the acid gas. Examples of suitable, and common in practice, physical absorption media are, for instance, cyclotetramethylene sulfone (sulfolane) and derivatives thereof, aliphatic acid amides (e.g. acetylmorpholine, N-formylmorpholine), N-alkylated pyrrolidones and piperidones (e.g. N-methylpyrrolidone), propylene carbonate, methanol or dialkyl ethers of polyethylene glycols.

In addition, a process has been found for removing acid gases from a gas stream by contacting the gas stream at a pressure of 0.05 to 10 MPa abs with a liquid absorption medium brought to and maintained at a temperature of 20 to 80° C., comprising liquid absorption medium (A) an oligoamine of the general formula (I)

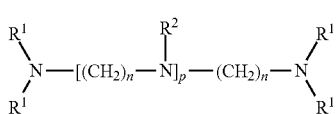
(I)

where
R$^1$ is hydrogen or C$_1$ to C$_3$ alkyl,
R$^2$ is hydrogen or C$_1$ to C$_3$ alkyl,
n is 2 to 6, and
p is 1 to 3; and
(B) a primary or secondary alkanolamine of the general formula (II)

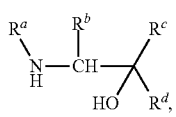
(II)

where
R$^a$ is hydrogen, C$_1$ to C$_3$ alkyl, —CH$_2$CH$_2$OH or —(CH$_2$)$_m$NH$_2$ where m is 1 to 3,
R$^b$ is hydrogen or C$_1$ to C$_3$ alkyl,
R$^c$ is hydrogen or C$_1$ to C$_3$ alkyl, and
R$^d$ is hydrogen, C$_1$ to C$_3$ alkyl, —CH$_2$OH or —CH$_2$NH$_2$, and
(C) water,
wherein the weight ratio of oligoamine (A) to the primary or secondary alkanolamine (B)

$m$[oligoamine (A)]/$m$[alkanolamine (B)]

is 0.2 to 4 and the weight ratio of the sum of oligoamine (A) plus primary or secondary alkanolamine (B) to water {$m$[oligoamine (A)]+$m$[alkanolamine (B)]}/$m$[water]

is 0.11 to 1.5.

Preferably, in the process according to the invention, use is made of the preferred absorbents mentioned in the description of the absorption medium.

The acid gas is absorbed by contacting the gas stream which is to be purified with the liquid absorption medium in a suitable device. Suitable devices comprise at least one scrubbing column, which, for example, can be constructed as a packed-bed, ordered-packing or tray column, and/or other absorbers such as, for example, a membrane contactor, a radial flow scrubber, a jet scrubber, a venturi scrubber or a rotary spray scrubber. The treatment of the gas stream with the absorption medium, however, preferably proceeds in a scrubbing column. This is operated particularly advantageously in countercurrent flow. The gas stream in this case is generally fed into the lower region and the absorption medium into the upper region of the column. The contacting proceeds in the process according to the invention at a pressure of 0.05 to 10 MPa abs.

The liquid absorption medium in this case is brought to and maintained at a temperature of 20 to 80° C., preferably, with respect to the lower limit, a temperature of greater than or equal to 30° C., and with respect to the upper limit, a temperature of less than or equal to 60° C. The gas, on entry into the separation device, generally has a temperature of 20 to 80° C., preferably 30 to 60° C.

In an advantageous embodiment, the acid gas is removed in a scrubbing column operated in counter-current flow, in which a discontinuous liquid phase forms in the interior, in the presence of activated carbon present in the interior of the scrubbing column. The scrubbing column that is to be used contains, in addition, the customarily used internals such as, for example, random packing or arranged packing elements. The activated carbon preferably has a carbon content of greater than 90% by weight and a BET surface area of 300 to 2000 m$^2$/g. The concentration thereof is generally 1 to 2000 g of activated carbon per m$^3$ of volume of the scrubbing column. The activated carbon can be supplied in various ways. In a preferred embodiment, it is suspended in the liquid absorption medium. In this case the particle size thereof is preferably in the range from 0.1 to 1000 μm, particularly preferably 0.1 to 50 μm. On the basis of the liquid absorption medium, the concentration of the suspended activated carbon is preferably 0.01 to 20 kg per m$^3$, particularly preferably 1 to 10 kg per m$^3$.

In another preferred embodiment it is mounted within the scrubbing column in a form fixed in space. In this case, the activated carbon is situated, for example, in liquid- and gas-permeable pockets mounted in fixed form (for instance in the form of activated carbon pellets) or fixed in the scrubbing column in arranged packing elements or random packing elements that are coated with activated carbon. On the basis of the volume of the scrubbing column, the concentration of the fixed activated carbon is preferably 1 g to 2 kg per m$^3$, particularly preferably 100 g to 1 kg per m$^3$. The presence of activated carbon increases the absorption rate of the liquid absorption medium, which leads to a still more effective process operation. Further details on the use of activated carbon in the absorption of acid gases in aqueous alkaline absorbents are described in the European priority document having the file number EP 09 154 427.0.

The acid gas can be released from the absorption medium loaded with the acid gas in a regeneration step, with a regenerated absorption medium being obtained. In the regeneration step, the loading of the absorption medium is reduced and the resultant regenerated absorption medium is preferably subsequently returned to the absorption step.

Generally, the loaded absorption medium is regenerated by warming (for example to 70 to 110° C.), by expansion and/or by stripping with an inert fluid, or a combination of two or all three of said measures. An inert fluid is considered to mean a gas which does not react chemically either with the absorption medium or with the acid gas and is also insoluble, or at most insignificantly soluble, in the absorption medium. Suitable inert fluids which may be mentioned are, for example, nitrogen, steam or air.

Generally, the loaded absorption medium, for regeneration, is warmed and the released acid gas is separated off, for example in a desorption column. Before the regenerated absorption medium is reintroduced into the absorber, it is cooled to a suitable absorption temperature. In order to utilize the energy present in the hot regenerated absorption medium, it is preferred to preheat the loaded absorption medium from the absorber by heat exchange with the hot regenerated absorption medium. The heat exchange brings the loaded absorption medium to a higher temperature, in such a manner that in the regeneration step a lower energy input is required. As a result of the heat exchange, if appropriate, also, a partial regeneration of the loaded absorption medium can already proceed with release of acid gas. The resultant gas-liquid mixed phase stream in this case is then passed into a phase separation vessel from which the acid gas is taken off. The liquid phase is passed into the desorption column for complete regeneration of the absorption medium.

As gas streams from which the acid gases are to be removed, use can be made in principle of all natural and synthetic, oxygen-comprising and oxygen-free gas streams such as, for example, natural gas, refinery gases, synthesis gases, biogases or flue gases. The process according to the invention proceeds, in the case of use of natural gases, preferably at a pressure of 3 to 10 MPa abs, in the case of use of refinery gases, preferably at a pressure of 0.05 to 10 MPa abs, in the case of use of synthesis gases, preferably at a pressure of 1.5 to 6 MPa abs and in the case of use of biogases or flue gases, preferably at a pressure of 0.05 to 0.5 MPa abs.

Very particular preference is given in the process according to the invention to removal of carbon dioxide from oxygen-comprising gas streams. These preferably comprise 0.1 to 21% by volume of oxygen. Preferred oxygen-comprising gas streams which may be mentioned in particular are
- combustion or flue gases which are obtained by the combustion of organic substances;
- gases from the composting or storage of organic substances, including organic waste; and
- gases from the bacterial decomposition of organic substances.

Acid gases are taken to mean compounds which are present in the gaseous state under the prevailing conditions in the gas stream which is to be purified and in aqueous solution have a pH of <7. Typical acid gases are, for example, carbon dioxide ($CO_2$), hydrogen sulfide ($H_2S$), sulfur dioxide ($SO_2$), carbonyl sulfide (COS), carbon disulfide ($CS_2$), hydrogen cyanide (HCN) and mercaptans (RSH). The process according to the invention preferably removes carbon dioxide and hydrogen sulfide, and particularly preferably carbon dioxide. For instance, the carbon dioxide concentration in the gas stream preferably used is preferably 0.1 to 50% by volume.

Generally the preferred gas streams comprise less than 100 mg/m$^3$ (S.T.P.) of sulfur dioxide and preferably less than 50 mg/m$^3$ (S.T.P.) of sulfur dioxide. In addition, the preferred gas streams generally contain less than 100 mg/m$^3$ (S.T.P.) of nitrogen oxides and preferably less than 50 mg/m$^3$ (S.T.P.) of nitrogen oxides.

Hereinafter, by way of example and without being restrictive, a possible procedure is described for the removal of carbon dioxide from flue gases using the process according to the invention. Before the absorption of carbon dioxide according to the invention, the flue gas is preferably first subjected to scrubbing with an aqueous liquid, in particular water, in order to cool the flue gas and to moisten (quench) it. In this scrubbing, dusts or gaseous impurities such as sulfur dioxide can also be removed.

Subsequently the pretreated flue gas is fed to the actual carbon dioxide removal. FIG. 1 shows in this context a schematic outline of a plant suitable for carrying out the process according to the invention. In the drawing:
1=Flue gas
2=Carbon-dioxide-depleted flue gas
3=Carbon dioxide separated off
A=Absorption column
B=Water scrubbing
C=Absorption
D=Cooler
E=Cooler
F=Pump
G=Pump
H=Desorption column
I=Heat exchanger
J=Reboiler
K=Condenser According to FIG. 1, flue gas 1 is passed into the lower part of the absorption column A and brought into contact with the absorption medium in countercurrent flow. The carbon-dioxide-depleted flue gas is further scrubbed with water in the upper part of the absorption column and passed out of the column overhead as stream 2. The absorption medium loaded with carbon dioxide is taken off at the bottom of the absorption column A and conducted via the pump G and the heat exchanger I into the desorption column H. In the lower part of the desorption column the loaded absorption medium is warmed via the evaporator J. As a result of the temperature elevation, a part of the absorbed carbon dioxide converts back into the gas phase. This is removed at the top of the desorption column H and cooled in the condenser K. Absorption medium which is condensed out is returned overhead. The gaseous carbon dioxide is taken off as stream 3. The regenerated absorption medium is returned via the pump F and the cooler E to the absorption column A.

The absorption medium according to the invention surprisingly exhibits very balanced properties with respect to the absorption rate, which is astonishingly very high, and with respect to the energy demand for regeneration, which is astonishingly very low. Therefore, owing to the high absorption rate, the use of a smaller absorption column is possible, since a smaller exchange area or a shorter residence time is absolutely sufficient. Likewise, the reboiler for the desorption column can also be designed to be smaller, since less energy is required for regenerating the absorption medium. As a result of the high absorption rate, the absorption medium according to the invention can also achieve a high circuit capacity.

EXAMPLES

Example 1

Relative Circuit Capacity and Relative Amount of Steam Required for Regeneration for Absorption Media According to the Invention and not According to the Invention For determining the carbon dioxide circuit capacity and the regeneration requirement, laboratory experiments were carried out using different absorption media loaded with carbon dioxide. The comparison base used was 30% by weight of monoethanolamine (MEA) in water. The absorption media according to the invention comprised 7.5 to 20% by weight of bis(3-dimethylaminopropyl)amine (BisDMAPA) and 15 to 37.5% by weight of monoethanolamine (MEA).

For determination of the relative circuit capacity and estimation of the relative amount of steam required for regeneration of the absorption medium, the equilibrium loadings of carbon dioxide in the absorption medium were determined as a function of the carbon dioxide partial pressure at 40° C. (for absorber bottom) and 120° C. (for desorber bottom). These measurements were carried out for all the systems listed in Table 1. For determination of the equilibrium loading, a glass pressure vessel having a volume of approximately 100 cm$^3$ was used. A defined amount of the absorption medium was placed in this, the vessel was evacuated and carbon dioxide was added at constant temperature stepwise via a defined gas volume. The amount of carbon dioxide dissolved in the liquid phase was calculated taking into account the gas space correction due to the gas phase above.

For estimation of the circuit capacity of the absorption medium, the following assumptions were made:

1. The absorber, at an overall pressure of one bar, is charged with a carbon-dioxide-comprising flue gas having a carbon dioxide partial pressure of 130 hPa (approximately equivalent to 13% by volume of carbon dioxide in the flue gas at atmospheric pressure).
2. In the absorber bottom a temperature of 40° C. prevails.
3. During the regeneration in the desorber bottom a temperature of 120° C. prevails.
4. In the absorber bottom, an equilibrium state is achieved. The carbon dioxide equilibrium partial pressure is therefore equal to the feed gas partial pressure of 130 hPa.
5. During the desorption, a carbon dioxide partial pressure of 100 hPa prevails in the desorber bottom.
6. During the desorption an equilibrium state is achieved.

The capacity of the absorption medium was determined from the loading (in $m^3$ (S.T.P.) of carbon dioxide/t of absorption medium) at the intersection of the 40° C. equilibrium curve with the line of constant feed gas carbon dioxide partial pressure of 13 kPa (loaded solution at the absorber bottom in equilibrium) and from the loading at the intersection of the 120° C. equilibrium curve with the line of constant partial pressure of 100 hPa (regenerated solution at the desorber bottom in equilibrium). The difference between the two loadings is the circuit capacity of the respective solvent. A high capacity means that less solvent needs to be circulated and therefore the apparatuses such as, for example, pumps, heat exchangers, and also piping can be dimensioned to be smaller. In addition, the circulation rate also affects the energy required for regeneration.

A further index of the application properties of an absorption medium is the gradient of the operating lines in the McCabe-Thiele diagram of the desorber. For the conditions in the bottom of the desorber, the operating line is generally very close to the equilibrium line, so that the gradient of the equilibrium curve can be approximately equated to the gradient of the operating lines. For a constant liquid loading, a smaller amount of stripping steam is required for regeneration of an absorption medium having a high gradient of the equilibrium curve. The energy requirement for generating the stripping steam contributes essentially to the overall energy requirement of the carbon dioxide absorption process.

The reciprocal of the gradient is expediently reported, since this is directly proportional to the required amount of steam per kilogram of absorption medium. If the reciprocal is divided by the capacity of the absorption medium, this gives a comparative value which directly enables a relative statement on the required amount of steam per amount of carbon dioxide absorbed.

In Table 1, the values of the relative circuit capacity and the relative amount of steam required are shown for the various absorption media normalized to MEA. Compared with 30% by weight of MEA, the relative circuit capacity increases to 103% when 7.5% by weight of BisDMAPA+22.5% by weight of MEA is used and to 107% when 15% by weight of BisDMAPA+15% by weight of MEA is used. The relative amount of steam required decreases in this series significantly through 87% to 72%. Therefore the use of 15% by weight of BisDMAPA+15% by weight of MEA for the regeneration of the absorption medium requires only 72% of the amount of steam of 30% by weight of MEA which constitutes a great potential saving in the industrial application.

Example 2

Relative Absorption Rates with Absorption Media According to the Invention and not According to the Invention For determination of the mass transport rate of the carbon dioxide from the gas stream into the absorption medium, measurements were carried out in a double stirred cell. The mass transport rate, in the case of a reactive absorption, has as components not only the physical mass transport but also the reaction kinetics between the absorption medium and the carbon dioxide. These two factors can be measured as summarized parameters in the double stirred cell. Comparative bases used were 31.2% by weight of monoethanolamine (MEA) in water and also 30% by weight of bis(3-dimethylaminopropyl)amine (BisDMAPA) in water. The absorption media according to the invention comprised 10 to 20% by weight of BisDMAPA and 15 to 39% by weight of MEA.

Figure 2:
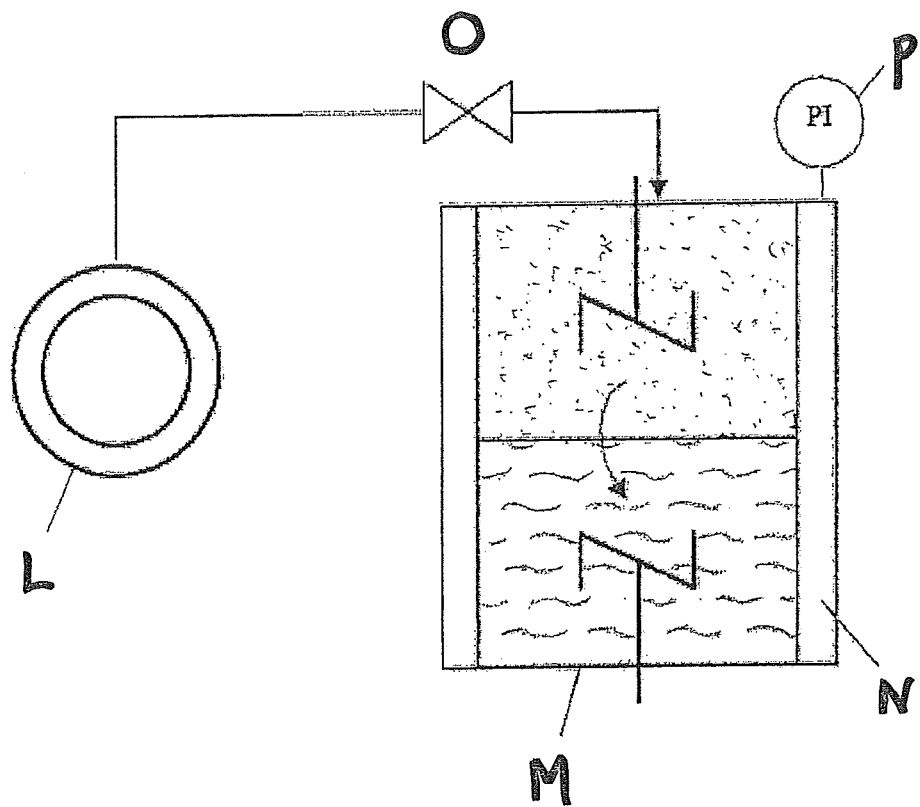
FIG. 2 shows a schematic outline of a double stirred cell.

FIG. 2 shows a schematic outline of the double stirred cell having the following elements:
L = Carbon dioxide storage vessel
M = Double stirred cell
N = Thermo stating
O = Metering valve
P = Pressure meter The doubled stirred cell had an internal diameter of 85 mm and a volume of 509 mL. The cell was thermostated to 50° C. during the experiments. For thorough mixing of the gas phase and liquid phase, the cell was equipped according to the schematic outline with two stirrers. Before the start of the experiment, the double stirred cell was evacuated. A defined volume of the degassed absorption medium was transported into the double stirred cell and thermostated to 50° C. During the heating up of the unloaded absorption medium, the stirrers were already switched on. The stirrer speed was selected such that a planar phase boundary between the liquid phase and the gas phase was set. A wave formation at the phase interface should be avoided, since as a result a defined phase interface would not be present. After the desired experimental temperature was reached, carbon dioxide was introduced into the reactor via a control valve. The volumetric flow rate was regulated in such a manner that in the double stirred cell during the experiment a constant pressure of 50 hPa abs prevailed (equivalent to carbon dioxide partial pressure). With increasing experimental period, the volumetric flow rate of carbon dioxide decreased, since the absorption medium with time became saturated and therefore the absorption rate decreased. The volumetric flow rate of carbon dioxide which flowed into the double stirred cell was recorded over the entire experimental period. The end of the experiment was reached as soon as carbon dioxide no longer flowed into the doubled stirred cell. The absorption medium was virtually in the equilibrium state at the end of the experiment.

For evaluation of the experiments, the absorption rate in mol of $CO_2/(m^3$ of absorption medium·min) was determined as a function of loading of the absorption medium. The absorption rate was calculated from the recorded volumetric flow rate of carbon dioxide and the charged volume of absorption medium. The loading was determined from the accumulated amount of carbon dioxide which was fed to the double stirred cell and the mass of absorption medium charged.

Table 2 shows the relative absorption rates of various absorption media at loading with 10 and 20 m³ (S.T.P.) of CO₂/t, normalized to BisDMAPA.

Compared with 30% by weight of BisDMAPA the relative absorption rate at a loading of 10 m³ (S.T.P.) of $CO_2$ per t of absorption medium increases to 246% with the use of 15% by weight of BisDMAPA+15% by weight of MEA and to 289% with the use of 10% by weight of BisDMAPA+20% by weight of MEA. At a loading of 20 m³ (S.T.P.) of $CO_2$ per t of absorption medium, the relative absorption rate with said amine mixtures increases through 332% to 408%. The carbon dioxide absorption rate in the BisDMAPA/MEA mixture is therefore up to four times higher than when pure BisDMAPA is used in the same total concentration of 30% by weight of amine in aqueous solution.

In contrast, the aqueous solution of 31.2% by weight of MEA shows the highest relative absorption rates of 378% in the case of a loading of 10 m³ (S.T.P.) of $CO_2$ per t of absorption medium and of 541% in the case of a loading of 20 m³ (S.T.P.) of $CO_2$ per t of absorption medium. However, it is necessary to take into account here the fact that according to Example 1 the use of a pure MEA solution in water has a significantly higher energy requirement (amount of steam) for regeneration compared with a BisDMAPA/MEA mixture.

Thus, although an aqueous MEA solution would have a very high absorption rate, it would likewise also have a very high energy requirement during the regeneration. Conversely, an aqueous BisDMAPA solution would have only an inadequately low absorption rate which on conversion to industrial scale, would require a significantly larger absorber column. Examples 1 and 2 verify that through the use of a corresponding mixture, surprisingly a very balanced absorption medium is obtained which not only has a high absorption rate but also has a very low energy demand for regeneration.

In addition, the effect was also studied in the experiments by adding activated carbon. For this purpose a mixture of 20% by weight of BisDMAPA and 20% by weight of MEA was additionally admixed with 0.1% by weight of activated carbon (Norit SA Super, BET surface area 1150 m²/g) and similarly to the other examples the relative absorption rate was determined. Compared with the mixture of 20% by weight BisDMAPA and 20% by weight MEA without activated carbon, the relative absorption rate increases in the presence of only 0.1% by weight activated carbon at a loading of 10 m³ (S.T.P.) of $CO_2$ per t of absorbent from 240% to 289% and for a loading of 20 m³ (S.T.P.) of $CO_2$ per t of absorbent from 342% to 437%. The results therefore show a further significant increase of the relative absorption rate due to the presence of activated carbon.

Example 3

Theoretical Examples of Absorption Media not According to the Invention

In theoretical examples of an absorption medium not according to the invention, aqueous solutions comprising
(A) an oligoamine of the general formula (I)

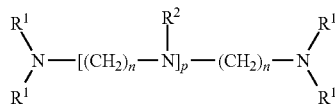

where
$R^1$ is hydrogen or $C_1$ to $C_3$ alkyl,
$R^2$ is hydrogen or $C_1$ to $C_3$ alkyl,
n is 2 to 6, and
p is 1 to 3; and
(B) an activator selected from the group
  (b1) diamine of the general formula (III)

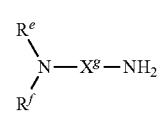

where
$R^e$ is hydrogen or $C_1$ to $C_6$ alkyl,
$R^f$ is hydrogen or $C_1$ to $C_6$ alkyl, and
$X^g$ is $C_2$ to $C_6$ alkylene,
  for example diethylaminoethylamine, dimethylaminopropylamine, methylaminopropylamine, diethylaminopropylamine or hexamethylenediamine,
  (b2) piperidine derivative of the general formula (IV)

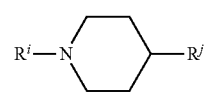

where
$R^i$ is hydrogen, $C_1$ to $C_3$ alkyl, —$CH_2CH_2OH$ or —$CH_2CH_2NH_2$;
$R^j$ is hydrogen, $C_1$ to $C_3$ alkyl, —OH, —$CH_2CH_2OH$ or —$CH_2CH_2NH_2$, for example 1-(2-aminoethyl)piperidine or 4-hydroxypiperidine,
  (b3) 1,4-diazacycloheptane;
  (b4) 1,3-diaminocyclohexane;
  (b5) pyrrolidine, 3-hydroxypyrrolidone or 2-(2-aminoethyl)-1-methylpyrrolidine;
  (b6) 1,2,3-triaminopropane;
  (b7) 2,2,6,6-tetramethyl-4-piperidylamine
  (b8) 1-(3-aminopropyl)imidazole
  (b9) 1,3-diamino-2,2-dimethylpropane, 1,2-diaminopropane or 1,3-diaminopentane;
  (b10) bis(2-aminoethyl)ether; and
  (b11) diethylenetriamine, N,N-bis-(N-methyl-3-aminopropyl)-N-methylamine, N,N-dimethyldipropylenetriamine, N,N',N"-trimethyl-bis-(hexamethylene)triamine or dipropylenetriamine;
are used, wherein the weight ratio of oligoamine (A) to the activator (B)

$$m[\text{oligoamine (A)}]/m[\text{activator (B)}]$$

is 0.2 to 4 and the total amount of oligoamine (A) plus activator (B) based on the total amount of the absorption medium is 10 to 60% by weight.

TABLE 1

Relative circuit capacity and amount of steam required normalized to MEA

| Absorption medium [% in % by weight] | m[Oligoamine (A)]/ m[activator (B)] | {m[Oligoamine (A)] + m[activator (B)]}/ m[water] | Concentration of amines based on total amount [% by weight] | Relative circuit capacity [%] | Relative amount of steam required [%] |
|---|---|---|---|---|---|
| 30% MEA | — | — | 30 | 100 | 100 |
| 15% BisDMAPA + 15% MEA | 1 | 0.43 | 30 | 107 | 72 |
| 7.5% BisDMAPA + 22.5% MEA | 0.33 | 0.43 | 30 | 103 | 87 |
| 20% BisDMAPA + 20% MEA | 1 | 0.67 | 40 | 137 | 66 |
| 10% BisDMAPA + 30% MEA | 0.33 | 0.67 | 40 | 126 | 87 |
| 12.5% BisDMAPA + 37.5% MEA | 0.33 | 1 | 50 | 161 | 91 |

MEA = monoethanolamine
BisDMAPA = bis(3-dimethylaminopropyl)amine

TABLE 2

Relative absorption rate of various absorption media at a loading with 10 and 20 m$^3$ (S.T.P.) of $CO_2$/t normalized to BisDMAPA

| Absorption medium [% in % by weight] | m[Oligoamine (A)]/ m[activator (B)] | {m[Oligoamine (A)] + m[activator (B)]}/ m[water] | Concentration of amines based on total amount [% by weight] | Relative absorption rate at a loading of 10 m$^3$ (S.T.P.) of $CO_2$ per t of absorption medium [%] | Relative absorption rate at a loading of 20 m$^3$ (S.T.P.) of $CO_2$ per t of absorption medium [%] |
|---|---|---|---|---|---|
| 31.2% MEA | — | — | 31.2 | 378 | 541 |
| 10% BisDMAPA + 30% MEA | 0.33 | 0.67 | 40 | 304 | 439 |
| 10% BisDMAPA + 20% MEA | 0.5 | 0.43 | 30 | 289 | 408 |
| 15% BisDMAPA + 15% MEA | 1 | 0.43 | 30 | 246 | 332 |
| 20% BisDMAPA + 20% MEA | 1 | 0.67 | 40 | 240 | 342 |
| 13% BisDMAPA + 39% MEA | 0.33 | 1.08 | 52 | 242 | 373 |
| 30% BisDMAPA | — | — | 30 | 100 | 100 |
| 20% BisDMAPA + 20% MEA + 0.1% AC | 1 | 0.67 | 40 | 289 | 437 |

MEA = monoethanolamine
BisDMAPA = bis(3-dimethylaminopropyl)amine
AC = activated carbon (Norit SA Super)

The invention claimed is:

1. An absorption medium for acid gases comprising
(A) an oligoamine of the general formula (I)

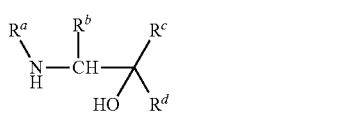

(I)

where
$R^1$ is $C_1$ to $C_3$ alkyl,
$R^2$ is hydrogen or $C_1$ to $C_3$ alkyl,
n is 2 to 6, and
p is 1 to 3; and
(B) a primary or secondary alkanolamine of the general formula (II)

(II)

where
$R^a$ is hydrogen, $C_1$ to $C_3$ alkyl, —$CH_2CH_2OH$ or —$(CH_2)_m NH_2$ where m is 1 to 3,
$R^b$ is hydrogen or $C_1$ to $C_3$ alkyl,
$R^c$ is hydrogen or $C_1$ to $C_3$ alkyl, and
$R^d$ is hydrogen, $C_1$ to $C_3$ alkyl, —$CH_2OH$ or —$CH_2NH_2$,
wherein the weight ratio of oligoamine (A) to the primary or secondary alkanolamine (B)

$m$[oligoamine (A)]/ $m$[alkanolamine (B)]

is 0.2 to 2.

2. The absorption medium for acid gases according to claim 1, in which the concentration of oligoamine (A) plus primary or secondary alkanolamine (B) based on the total amount of the absorption medium is 10 to 60% by weight.

3. The absorption medium for acid gases according to claim 1, in which the concentration of oligoamine (A) based on the total amount of the absorption medium is between 1 and 20% by weight.

4. The absorption medium for acid gases according to claim 1, in which the oligoamine (A) is bis(3-dimethylaminopropyl)amine.

5. The absorption medium for acid gases according to claim 1, in which the primary or secondary alkanolamine (B) is monoethanolamine.

6. The absorption medium for acid gases according to claim 1 comprising water, wherein the weight ratio of the sum of oligoamine (A) plus primary or secondary alkanolamine (B) to water {$m$[oligoamine (A)]+$m$[alkanolamine (B)]}/$m$[water]

is 0.11 to 1.5.

7. A process for removing acid gases from a gas stream by contacting the gas stream at a pressure of 0.05 to 10 MPa abs with a liquid absorption medium brought to and maintained at a temperature of 20 to 80° C., the liquid absorption medium comprising an absorption medium for acid gases according to claim 6.

8. The process according to claim 7, wherein the acid gas is removed in a scrubbing column operated in countercurrent flow, in which scrubbing column a discontinuous liquid phase forms in the interior, in the presence of activated carbon that is present in the interior of the scrubbing column.

9. The process according to claim 7, wherein biogas or flue gas is contacted with the liquid absorption medium at a pressure of 0.05 to 0.5 MPa abs.

10. The process according to claim 7, wherein the gas stream comprises 0.1 to 21% by volume of oxygen.

11. The process according to claim 7, wherein the acid gas comprises carbon dioxide and the carbon dioxide concentration in the gas stream is 0.1 to 50% by volume.

12. The process according to claim 7, wherein the absorption medium which is loaded with carbon dioxide after the contacting with the gas stream is regenerated by warming, by expansion, by stripping with an inert fluid, or a combination of two or all three of said measures.

13. The absorption medium for acid gases according to claim 2, in which the concentration of oligoamine (A) based on the total amount of the absorption medium is between 1 and 20% by weight.

14. The absorption medium for acid gases according to claim 2, in which the oligoamine (A) is bis(3-dimethylaminopropyl)amine.

15. The absorption medium for acid gases according to claim 3, in which the oligoamine (A) is bis(3-dimethylaminopropyl)amine.

16. The absorption medium for acid gases according to claim 2, in which the primary or secondary alkanolamine (B) is monoethanolamine.

17. The absorption medium for acid gases according to claim 3, in which the primary or secondary alkanolamine (B) is monoethanolamine.

18. The absorption medium for acid gases according to claim 4, in which the primary or secondary alkanolamine (B) is monoethanolamine.

19. The absorption medium for acid gases according to claim 2 comprising water, wherein the weight ratio of the sum of oligoamine (A) plus primary or secondary alkanolamine (B) to water $$\{m[\text{oligoamine (A)}]+m[\text{alkanolamine (B)}]\}/m[\text{water}]$$

is 0.11 to 1.5.

20. The absorption medium for acid gases according to claim 3 comprising water, wherein the weight ratio of the sum of oligoamine (A) plus primary or secondary alkanolamine (B) to water $$\{m[\text{oligoamine (A)}]+m[\text{alkanolamine (B)}]\}/m[\text{water}]$$

is 0.11 to 1.5.

\* \* \* \* \*